United States Patent [19]

Soleau

[11] 4,282,862
[45] Aug. 11, 1981

[54] THIN-LINE COLLECTORS

[76] Inventor: Bertrand S. Soleau, 4203 Kincaid Ct., Chantilly, Va. 22021

[21] Appl. No.: 93,035

[22] Filed: Nov. 9, 1979

[51] Int. Cl.³ .................................................. F24J 3/02
[52] U.S. Cl. .................................... 126/439; 126/440; 350/452
[58] Field of Search ............... 126/438, 439, 440, 450; 350/258–262, 211

[56] References Cited

U.S. PATENT DOCUMENTS

| 3,471,221 | 10/1969 | Seeger | 350/263 |
| 4,074,704 | 2/1978 | Gellert | 126/440 |
| 4,078,548 | 3/1978 | Kapany | 126/440 |

FOREIGN PATENT DOCUMENTS 2827708  1/1979  Fed. Rep. of Germany ........... 126/439

Primary Examiner—James C. Yeung
Attorney, Agent, or Firm—Robert W. Carlson

[57] ABSTRACT

Thin-line solar energy collectors are disclosed. The solar collectors of this invention function by internally redirecting incident light to the periphery of the collector where it is absorbed by a heat transfer fluid. This is accomplished by reducing the angular dispersion of the incident light with a high index of refraction glass, reflecting the light from wedge shaped surfaces and then transporting the light to the periphery of the collector module via total internal reflection. A typical collector is made up of a plurality of glass modules mounted in a frame through which the heat transfer fluid is circulated. Each individual glass module is a collector designed in accordance with this invention and is typically ⅜ inches thick by 1½ inches wide by 3 feet long.

7 Claims, 3 Drawing Figures

U.S. Patent  Aug. 11, 1981  Sheet 1 of 2  4,282,862
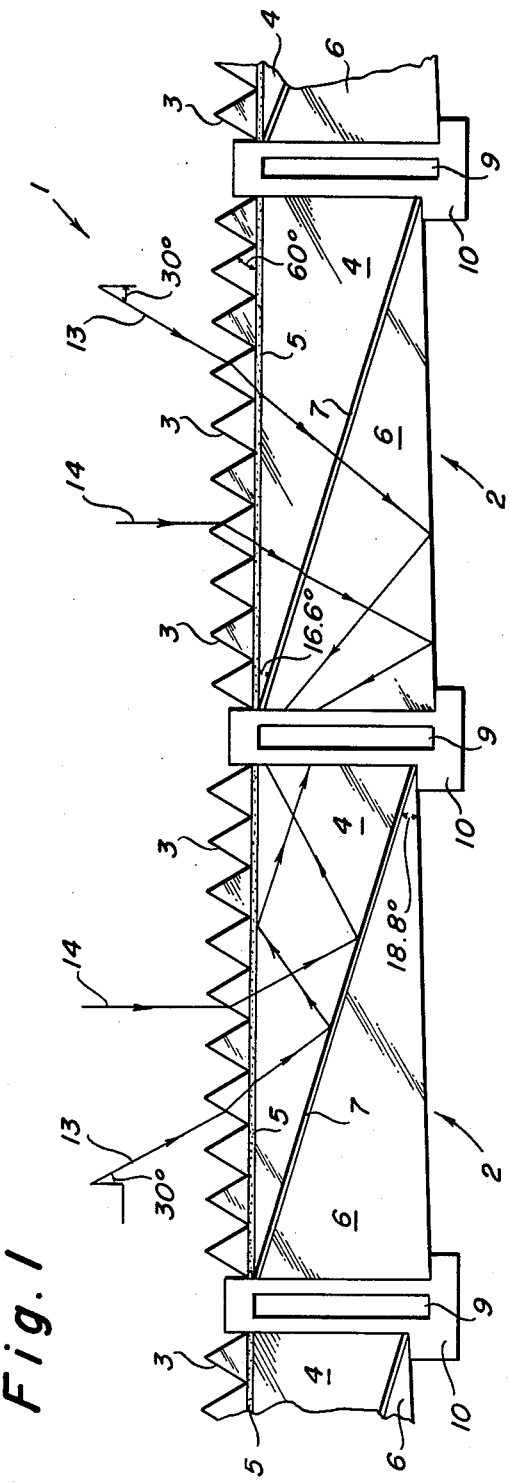
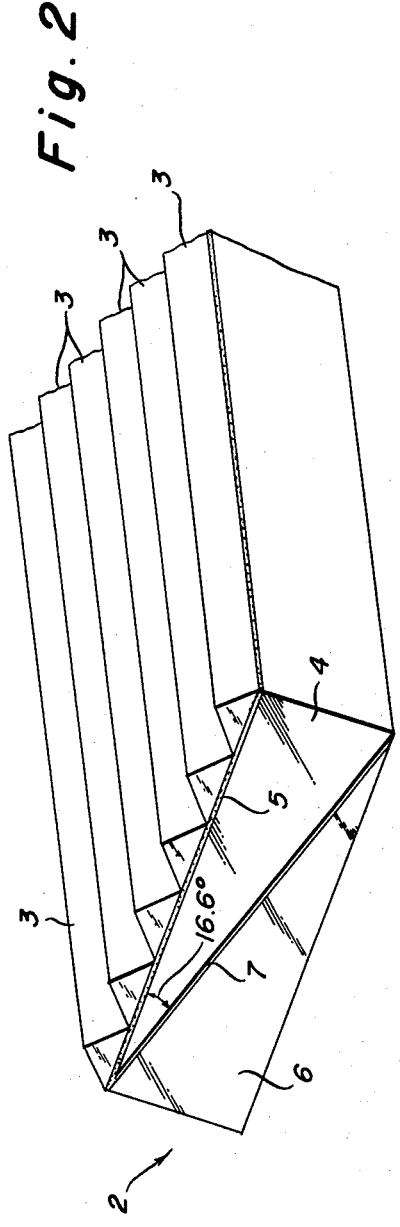

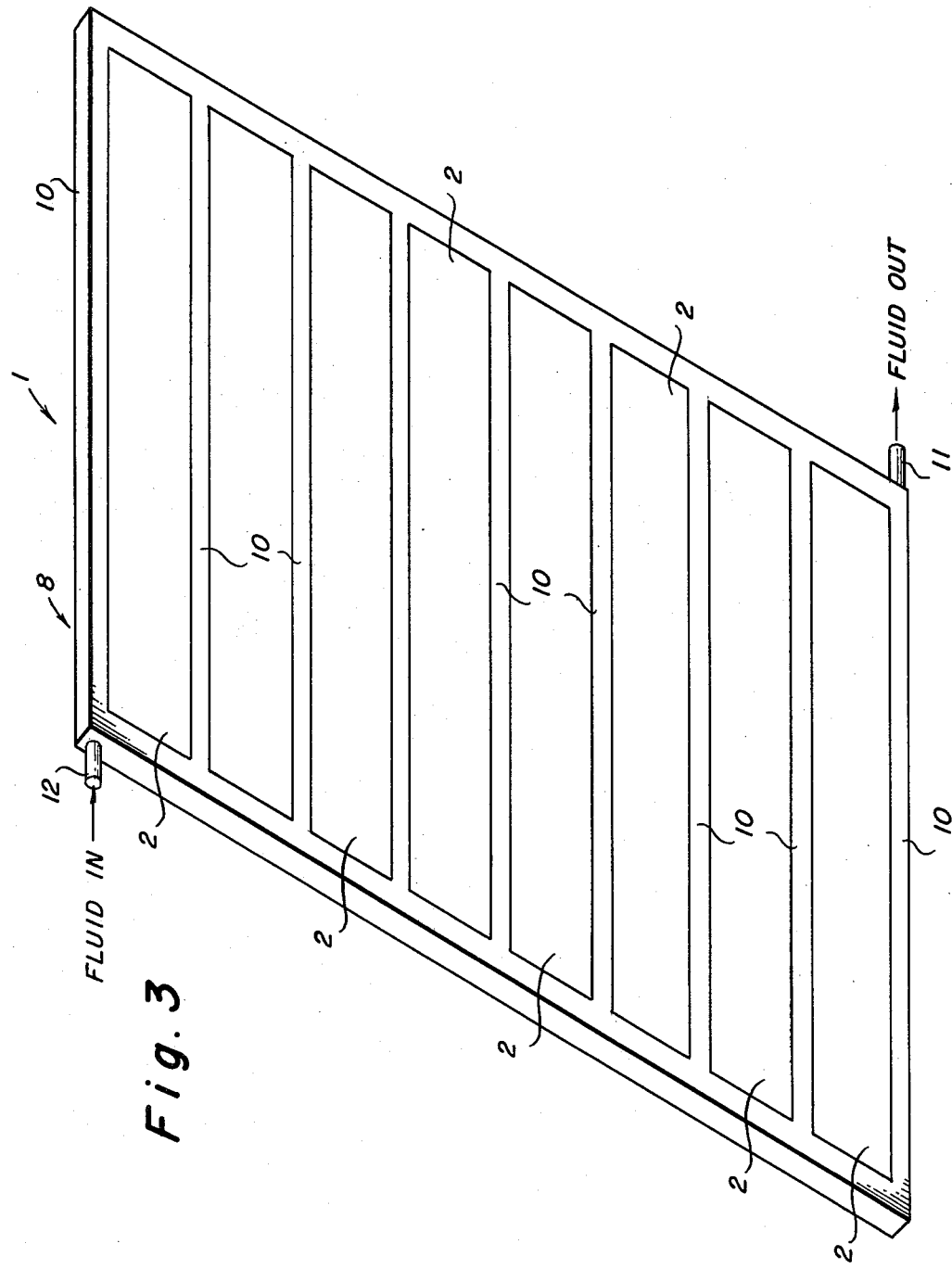

THIN-LINE COLLECTORS

BACKGROUND OF THE INVENTION

This invention relates to solar collectors and more particularly to a thin-line-non-focusing concentrating solar collector.

Flat plat solar collectors of numerous different designs are known in the art. These prior art devices generally include one or more plates of glass or plastic that are mounted in a frame. The collectors are generally heat insulated to prevent heat losses. As a result the prior art flat plate solar collectors are large bulky devices.

Another type of prior art solar collectors are the concentrating type collectors that use some method of focusing the solar energy. For example, one type of prior art focusing collectors uses a parabola to focus the solar energy.

This invention provides a concentrating solar collector without focusing. Further, the solar collector of the invention is made up of a plurality of individual modules or collectors that are small in size, light weight and therefore easily transported.

The thin-line collectors of this invention provide a concentration ratio of about 2:1, do not require glazing or back insulation, hermetic sealing is not required, and tracking of the sun is not required. In addition, the solar collectors of this invention provide good efficiency due to minimum heat loss areas, the efficiency is relatively independent of ambient temperature, and are suitable for both thermal and photovoltaic applications.

SUMMARY OF THE INVENTION

The solar collector of this invention is a thin-line, non-focusing, concentrating collector. The collector is made up of a plurality of individual collectors or glass modules that are mounted in a frame through which the heat transfer fluid is circulated.

In the preferred embodiment, the individual glass modules include a wedge of glass having an index of refraction. The wedges are connected to a generally triangular shaped piece of glass also having a high index of refraction and this triangular shaped piece of glass is cemented to another generally triangular shaped piece of glass also having a high index of refraction.

These individual modules are relatively small in size. For example, each module will typically be $\frac{3}{8}$ inches thick, $1\frac{1}{2}$ inches wide and 3 feet long. These dimensions are given by way of example and are not to be considered limiting or critical dimensions. Each module is mounted in a frame through which a heat transfer fluid is circulated. Each module accepts the energy incident upon it and delivers it to the fluid around its edges. The module is so designed that the energy is totally internally reflected to the periphery of the module.

BRIEF DESCRIPTION OF THE DRAWING

A full and complete understanding of the invention can be obtained from the following detailed description when read in conjunction with the annexed drawing in which:

FIG. 1 shows, in cross-section, part of a solar collector constructed in accordance with a preferred embodiment of this invention and FIG. 2 is a planar view part of a preferred embodiment of the individual modules or collectors of this invention; and FIG. 3 shows a solar collector constructed in accordance with a preferred embodiment of this invention.

DETAILED DESCRIPTION OF THE INVENTION

Referring to FIGS. 1 and 2, the solar collector 1 of this invention is made up of a plurality of glass modules or collectors 2. Only two complete modules or collectors 2 are shown in FIG. 1. As shown in FIGS. 1 and 2, each module or collector 2 includes a plurality of glass wedges 3. The wedges 3 form the top surface of each collector or module 2 and have a high index of refraction. For example an index of approximately 1.8.

The glass wedges 3 are glued to a triangular shaped piece of glass 4 by means of a glass cement 5 having an index of approximately 1.4. The triangular shaped piece of glass 4 also has a high index of refraction, for example an index of approximately 2.

The triangular shaped piece of glass 4 is cemented to a second triangular shaped piece of glass 6 by means of a glass cement having an index of refraction of approximately 1.4. The triangular shaped piece of glass 6 also has a high index of refraction. For example an index of approximately 2.

Instead of being cemented along their entire mating surfaces, triangular shaped pieces of glass 5 and 6 can be cemented along their mating edges with remaining space between the mating surface being a dead air space.

Each of the modules or collectors 2 are mounted in a frame 8 (FIG. 3), having the channels 9 which carry the heat transfer fluid not shown.

Referring to FIG. 3, a complete collector 1 is made up of a plurality of individual modules or collectors 2 mounted in the frame 8 which has a plurality of the arms 10 which contain the heat transfer fluid carrying channels 9. The cold fluid enters the frame 8 at the inlet 11 and the heated fluid flows out of the outlet 12. The collector 1 shown in FIG. 3 represents an example of a collector constructed in accordance with this invention. More or less individual modules 2 may be provided. In addition, a plurality of the modules 2 may be arranged end to end as well as side to side as shown or a plurality of collectors 1 may be provided in a given application.

Referring to FIG. 1, solar energy enters the individual modules or collectors at the wedges 3 since these wedges form the top of the collector. Each individual collector or module 2 has an acceptance angle of ±30° which is indicated by the angle associated with the lines 13. The lines 13 indicate solar radiation at a 30° angle. As shown in FIG. 1, this radiation is totally reflected externally to the arms 10 and heats the fluid in channels 9. The sides of the arms 10 adjacent the modules 2 and is of a good heat conducting material to provide good heat transfer to the fluid. The top and bottoms of the arms 10 are preferably made of a heat insulating material. The lines or arrows 14 in FIG. 1 indicate vertically incident radiation and shown how this radiation is totally reflected internally.

While FIGS. 1, 2 and 3 show a thermal collector, the collector of this invention can also be used in photovoltaic applications. For such applications, the arms 10 would have a plurality of solar cells mounted on their outside surfaces adjacent the collectors or modules 2. Wires would be brought out through the arms to transport the generated electricity to the load being powered by the solar cells.

From the foregoing description, it should be apparent that the solar collector of this invention provides a non-focusing concentrating solar collector that does not have to follow the sun. A concentration ratio of approximately 2:1 is obtained. Total internal reflection is obtained in the individual collectors or modules 2. Further, the collector of this invention provides many advantages over conventional flat plate collectors such as reduction in size and weight, higher concentration without following the sun and ease of construction among others.

While the invention has been described with reference to a preferred embodiment, it will be apparent to those skilled in the art that various changes and modifications can be made to this embodiment without departing from the spirit and scope of the invention as set forth in the claims.

What is claimed is:

1. A solar collector comprising:
   at least one glass module, said glass module comprising a plurality of glass wedges having a high index of refraction, a first triangular shaped piece of glass having a high index of refraction cemented to said wedges and a second piece of triangular shaped glass having a high index of refraction cemented to said first piece of triangular shaped glass, said first and second triangular shaped pieces of glass being so arranged as to form a generally rectangular shape with said plurality of wedge shaped pieces of glass protruding from the top surface of said generally rectangular shape; and
   means for converting solar energy incident on said glass module to a different form of energy, said means for converting solar energy incident on said glass module to a different form of energy being secured around the outside surface of said glass module.

2. A solar collector as defined in claim 1 wherein said means for converting solar energy incident on said glass module to a different form of energy comprises a frame having heat transfer fluid carry channels and wherein said solar energy is converted to heat energy.

3. A solar collector as defined in claim 2 wherein said plurality of glass wedges have an index of refraction of approximately 1.8, said first triangular piece of glass has an index of refraction of approximately 2 and said second triangular shaped piece of glass has an index of refraction of approximately 2.

4. A solar collector as defined in claim 1 wherein said collector includes a plurality of said glass modules and wherein said module is surrounded by said means for converting solar energy.

5. A solar collector as defined in claim 4 wherein each module is approximately ⅜ inches thick, approximately 1½ inches wide and approximately 3 feet long.

6. A solar collector comprising:
   at least one glass module, said glass module comprising a plurality of wedge shape pieces of glass having a high index of refraction;
   a first triangular shaped piece of glass having a high index of refraction, said plurality of wedge shaped pieces of glass being cemented to said first piece of triangular shaped piece of glass; and
   a second triangular shaped piece of glass having a high index refraction, said second piece of triangular shaped piece of glass being cemented to said first piece of triangular shaped piece of glass along their mating edges to form an air space therebetween, said wedge and said first and second triangular shaped pieces of glass being so arranged relative to each other to form a generally rectangular shape so that incident solar radiation on said glass module is totally reflected internally to the periphery of said glass module.

7. A solar collector as defined in claim 6 comprising means surrounding said glass module for converting solar energy incident to a different form of useful energy.

* * * * *